United States Patent [19]

Miyazaki

[11] Patent Number: 4,974,792
[45] Date of Patent: Dec. 4, 1990

[54] LEVEL WINDER FOR FISHING REELS

[75] Inventor: Takeo Miyazaki, Tokyo, Japan

[73] Assignee: Daiwa Seiko, Inc., Tokyo, Japan

[21] Appl. No.: 393,727

[22] Filed: Aug. 15, 1989

[30] Foreign Application Priority Data

Sep. 7, 1988 [JP] Japan .................. 63-224344

[51] Int. Cl.$^5$ .......................................... A01K 89/015
[52] U.S. Cl. .................................................. 242/279
[58] Field of Search ............ 242/279, 280, 281, 158.2, 242/158.3

[56] References Cited

U.S. PATENT DOCUMENTS

| 718,416 | 1/1903 | Bishop | 242/158.3 |
| 1,579,076 | 3/1926 | Case | 242/279 |
| 3,447,760 | 6/1969 | Sarah | 242/279 |
| 4,772,410 | 9/1988 | Sato | 242/279 |

FOREIGN PATENT DOCUMENTS 37-9810  3/1962  Japan .

Primary Examiner—Katherine Matecki
Attorney, Agent, or Firm—Browdy and Neimark

[57] ABSTRACT

An improvement in a level winder for fishing reels, which enables a fishing line guide member to be easily set on and removed from a guide cylinder, and the turning of the fishing line guide member with respect to the guide cylinder to be prevented, and which can attain the simplification of the construction of the level winder, an operation for assembling the level winder during the production thereof and an operation for disassembling the level winder during the replacement of a locking claw and the maintenance work the level winder, comprising a traverse cam shaft supported between the side plates of a fishing reel and turned with a handle shaft, a guide cylinder fitted around the cam shaft, and supported between and formed integrally with the side plates so as to have a non-circular cross-sectional shape, a fishing line guide member having a fishing line guiding bore at the upper portion thereof and an opening-carrying bifurcated part at the lower portion thereof, via which opening the fishing line guide member can be fitted around the guide cylinder so that the guide member can be moved slidingly and laterally, and a cap supporting a locking claw, which is engaged with the cam shaft, and engaged detachably with the bifurcated part.

8 Claims, 2 Drawing Sheets

LEVEL WINDER FOR FISHING REELS

BACKGROUND OF THE INVENTION:

1. Field of the Invention:

This invention relates to an improvement in a level winder for guiding a fishing line in a fishing reel, especially, a double bearing type fishing reel.

2. Description of the Prior Art:

As seen in, for example, Japanese Utility Model Publication No. 9810/1987, a fishing line guide member in a conventional level winder of this kind is inserted around a guide cylinder, which is provided around a traverse cam shaft operatively connected to a handle shaft, from one end portion thereof and set firmly thereon, and one side portion of this fishing line guide member is supported on a support rod extending between the side plates of a reel.

However, during the manufacturing of such a conventional level winder, or, during the disassembling of such a level winder for repairing it for the maintenance thereof, it is necessary that the fishing line guide member be inserted around or withdrawn from a guide cylinder from one end thereof with the side plates of a reel removed, so as to set the fishing line guide member on the guide cylinder firmly or remove the fishing line guide member therefrom. Therefore, the operations for assembling and disassembling the level winder become very troublesome. Moreover, it is also necessary that one side portion of the fishing line guide member be guided by and supported on a support rod provided on the side plates of the reel, so as to prevent the fishing line guide member from being turned, so that the construction of the level winder becomes complicated.

SUMMARY OF THE INVENTION

In view of the abovementioned situation, the present invention has it as its primary object to provide a level winder which enables a fishing line guide member to be easily set on and withdrawn from a guide cylinder, and which can prevent the fishing line guide member from being turned with respect to the guide cylinder, an operation for assembling the level winder during the manufacturing thereof, an operation for disassembling the level winder during the replacement of a locking claw and the construction of the level winder being thereby simplified.

A first feature of the present invention is to provide a level winder in which an opening is formed in a lower portion, or a front portion or a rear portion of fishing line guide member, which is adapted to be moved slidingly in the lateral direction on a guide cylinder, so as to enable the fishing line guide member to be fitted around the guide cylinder in a direction perpendicular to the axis of the guide cylinder by utilizing this opening, the operations for assembling and disassembling the level winder during the manufacturing thereof or maintenance work therefor, or an operation for replacing a locking claw thereby becoming able to be carried out simply and speedily with ease.

A second feature of the present invention, is to provide a level winder in which an opening at which a fishing line guide member is set on and withdrawn from a guide cylinder is formed in a lower portion of the fishing line guide member, the inward deformation of a bifurcated portion around this opening being prevented by a reinforcement support member so that locking action of a locking claw, which is supported in the opening, with respect to a traverse cam shaft can be made without troubles, a smooth traverse movement of the fishing line guide member, the prevention of abrasion of a groove in the traverse cam shaft and the locking claw and a long lifetime of the level winder being thereby attained.

A third feature of the present invention is to provide a level winder in which the outer surface of a guide cylinder on which a fishing line guide member is moved slidingly in the lateral direction is formed to a non-circular cross-sectional shape to enable the fishing line guide member to be fitted around the guide cylinder so that the fishing line guide member is not turned with respect to the guide cylinder, and to render it unnecessary to provide a turning preventing support rod between the side plates of a reel, the simplification of the construction of a front portion of the reel and the prevention of entanglement of a fishing line being thereby attained.

Another feature of the present invention is to provide a level winder in which a guide cylinder can be formed integrally with the frames attached to side plates of a reel owing to the structural characteristics of a fishing line guide member that the fishing line guide member can be fitted on and removed from the guide cylinder in a direction perpendicular to the axis of the guide cylinder, the reinforcement of the frames attached to the side plates of the reel, the facilitation of the production of the level winder and the improvement of the manufacturing accuracy being thereby attained.

The above and other objects as well as advantageous features of the invention will become apparent from the following description of the preferred embodiments taken in conjunction with the accompanying drawings.

DESCRIPTION OF THE PREFERRED EMBODIMENTS

Figure 1:
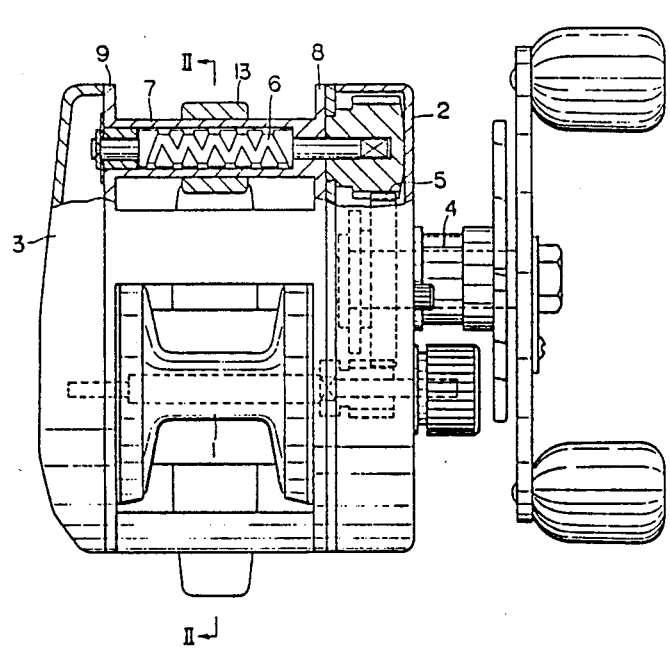
FIG. 1 is a plan view of the present invention with its principal portion shown in section.
Figure 3:
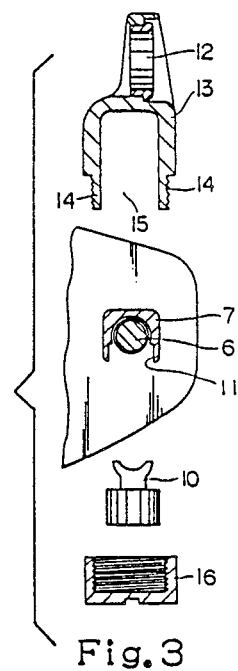
FIG. 3 is an exploded view in section of the mentioned principal portion showing how this portion is assembled and disassembled.
Figure 2:
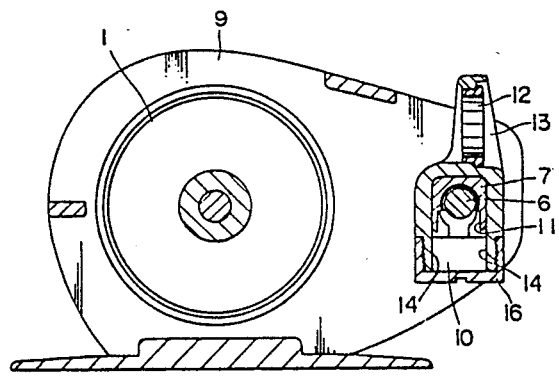
FIG. 2 is a sectioned side elevation taken along the line II—II in FIG. 1.
Figure 4:
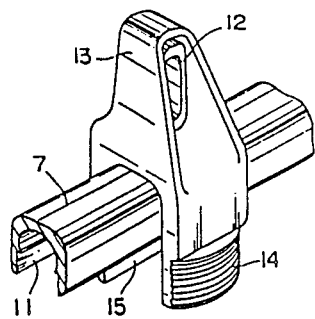
FIG. 4 is a perspective view of this principal portion showing how the principal portion is assembled and disassembled.

The details of the present invention will now be given with reference to the drawings. A traverse cam shaft 6 connected operatively to and turned with a handle shaft 4 via a gear 5 is supported between side plates 2, 3, on which a spool 1 is also supported, of a double bearing type reel, and a guide cylinder 7 which is disposed around the traverse cam shaft 6 is formed integrally with frames 8, 9 attached to the side plates 2, 3 of the reel.

A driving gear is provided on the handle shaft 4 as generally known, and it is meshed with a pinion mounted on a spool shaft for use in turning the spool 1. When the handle shaft 4 is turned, the traverse cam shaft 6 can be turned therewith.

The outer surface of the guide cylinder 7 is formed to be a non-circular, i.e. square cross-sectional shape, and the guide cylinder 7 is provided at the lower portion thereof with a recess 11 for the purpose of moving therein a locking claw 10 engaged with a groove in the traverse cam shaft 6.

A fishing line guide member 13 having a fishing line guide bore 12 at the upper portion thereof is formed so that the guide member 13 can be fitted around the guide cylinder 7 so as not to be turned with respect thereto. The fishing line guide member 13 is further provided at its lower portion with an opening 15, which is defined by the blades, 14, 14 of a bifurcated portion, in such a manner that the opening 15 enables the locking claw 10 to be fitted therein, and the guide member 13 to be fitted at itself around the guide cylinder 7 from the upper side thereof. A cap 16 supporting the lower end of the locking claw 10 is screwed detachably on the blades 14, 14 of the bifurcated portion.

Accordingly, when the handle shaft 4 is turned to turn the traverse cam shaft 6, the fishing line guide member 13 is moved slidingly in the lateral direction on the guide cylinder 7 since the locking claw 10 is engaged with the traverse cam shaft 6, so that a fishing line is wound around a spool 1 as the fishing line is guided laterally by the guide bore 12. In order to carry out an assembling operation during the production of the level winder, or a disassembling operation during the replacement or repairing of the worn or broken locking claw, the cap 16 is engaged with or disengaged from the blades 14, 14 of the bifurcated portion, and the fishing line guide member 13 is fitted around or removed from the guide cylinder 7 in the vertical direction of the guide cylinder 7 via the opening 15 defined by the blades 14, 14 of the bifurcated portion.

Figure 5:
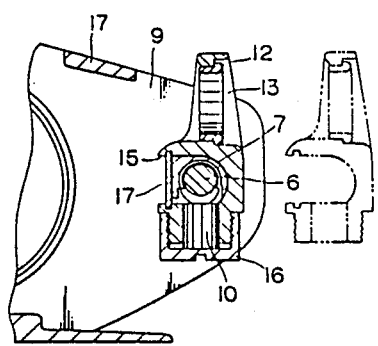
FIG. 5 is a sectioned side elevation of another embodiment of the present invention.
Figure 6:
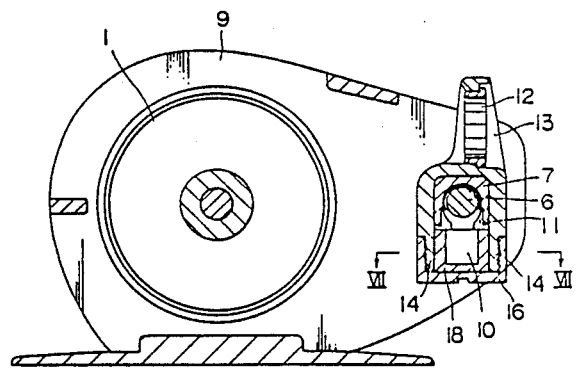
FIG. 6 is a sectioned side elevation of still another embodiment of the present invention.
Figure 7:
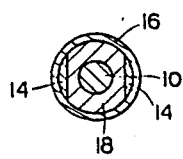
FIG. 7 is a sectional view taken along the line VII—VII in FIG. 6.
Figure 8:
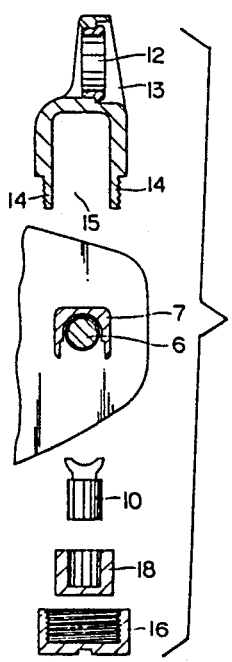
FIG. 8 is an exploded view in section of a principal portion of the embodiment of FIG. 6, showing how this principal portion is assembled and disassembled.
Figure 9:
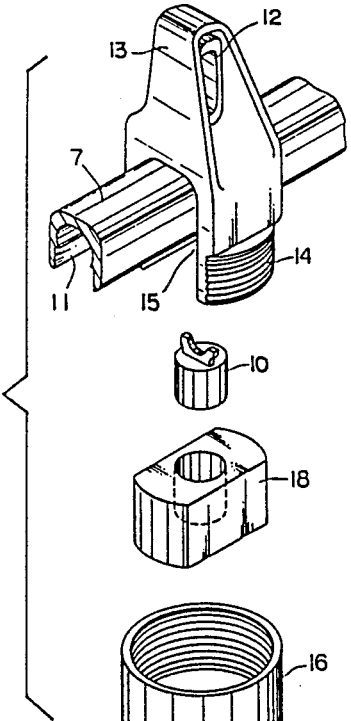
FIG. 9 is a perspective view showing how this principal portion is assembled and disassembled.

In this embodiment, the blades 14, 14 of the bifurcated portion are formed at the lower part of the fishing line guide member 13 so as to define the opening 15. FIG. 5 shows an embodiment in which an opening 15, which enables a fishing line guide member 13 to be fitted around a guide cylinder 7 from the front side thereof, is provided in the rear portion of a locking part of the fishing line guide member 13 with respect to the guide cylinder 7. In this embodiment, a disengagement preventing cover 17 is provided detachably in the opening 15. This disengagement preventing cover 17 and a cap 16 are removed to detach the fishing line guide member 13 to a position in front of the guide cylinder 7 as shown by the chain line.

In an embodiment shown in FIGS. 6-9 in which a fishing line guide member 13 is fitted around and removed from a guide cylinder 7 via an opening 15 defined by the blades 14, 14 of the bifurcated portion formed at the lower part of the fishing line guide member 13, a locking claw 10 engaged with a traverse cam shaft 6 is fitted and supported in a reinforcing support member 18, and this reinforcing support member 18 is fitted in the space between the blades 14, 14 of the bifurcated portion to prevent the inward deformation of these blades 14, 14, the cap 16 being then screwed on the same blades 14, 14. Since the deformation of the bifurcated portions is thus prevented, the locking claw 10 can be kept in a stably engaged state with respect to the traverse cam shaft 6, and a traversing action can be made smoothly. Moreover, the abrasion of the groove in the traverse cam shaft 6 and the locking claw 10 can be prevented, and the durability of the level winder can be improved.

Figure 10:
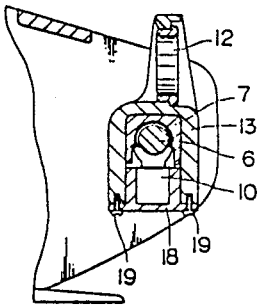
FIG. 10 is a sectioned side elevation of a further embodiment of the present invention.
Figure 11:
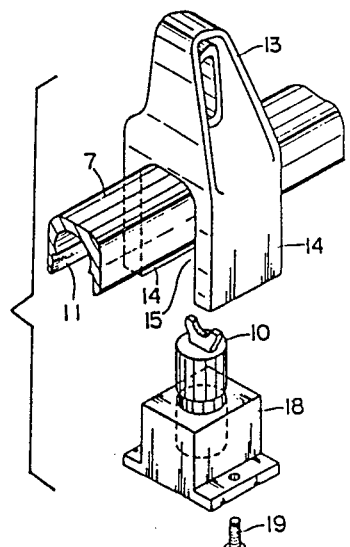
FIG. 11 is a perspective view of a principal portion of the embodiment of FIG. 10, showing how the principal portion is assembled and diassembled.

In an embodiment shown in FIGS. 10 and 11, a reinforcing support member 18 in which a locking claw 10 is fitted and supported is fixed detachably and directly between the blades 14, 14 of a bifurcated portion with screws 19 to prevent the deformation of these blades 14, 14, whereby a smooth traverse action by the locking claw 10 and the improvement of the durability of the engaged portions are attained in the same manner as in the previously described embodiments.

According to the present invention described above, a fishing line guide member of a level winder is fitted around a guide tube from an upper or side portion thereof by utilizing an opening provided in a lower bifurcated portion of the guide member or an opening provided at a side portion thereof, in such a manner that the fishing line guide member can be engaged with and disengaged from the guide cylinder in a direction perpendicular to the axis of the guide tube. Therefore, the operations for assembling and disassembling the level winder during the production thereof and the maintenance work therefor can be carried out speedily and easily, and the operation efficiency can be improved. Since the fishing guide member is engaged with a guide cylinder the outer surface of which is formed to be a cross-sectionally non-circular shape, the turning thereof can be prevented without using any turning preventing support rod which is employed in a conventional level winder. This enables the construction of a level winder in a fishing reel to be simplified, and the entanglement of a fishing line to be prevented.

In an embodiment having, especially, a bifurcated portion at the lower section of a fishing line guide member, and a reinforcing support member fitted between the blades of the bifurcated portion and supporting a locking claw in an enclosing state so as to prevent the inward deformation of the bifurcated portion, the prevention of the occurrence of an adverse effect on the engagement of the locking claw with a traverse cam shaft, a smooth sliding action of the fishing line guide member with respect to a guide cylinder, the prevention of abrasion of the groove in the traverse cam shaft and the locking claw and the improvement of the durability of the lever winder can be attained.

Since the fishing line guide member in the present invention can be engaged with the guide cylinder from the upper or side portion thereof, the guide cylinder can be formed integrally with the frames attached to the side plates of a reel. This advantageously enables the reinforcement of the frames, the facilitation of the manufacturing steps and the improvement of the manufacturing accuracy.

The present invention is not, of course, limited to the above embodiments; it may be modified in various ways within the scope of the appended claims.

What is claimed is:

1. A level winder for fishing reels, comprising: a traverse cam shaft supported between side plates of a fishing reel; means for turning said traverse cam shaft, said means for turning including a handle shaft; a guide cylinder fitted around said traverse cam shaft, supported between said side plates and formed so that an outer surface of said guide cylinder has a non-circular cross-sectional shape and an upper side; a fishing line guide member provided at an upper portion thereof with a fishing line guiding bore, and at a lower portion thereof with a bifurcated part defining an opening via which said fishing line guide member is fitted around the outer surface of said guide cylinder from the upper side thereof so that said guide member can be moved slidingly along said guide cylinder between said guide plates; a locking claw engaged with said traverse can shaft; and a cap which supports said locking claw on said fishing line guide member, and which is engaged detachably with said opening-defining bifurcated part of said fishing line guide member.

2. A level winder for fishing reels according to claim 1, wherein said guide cylinder is formed integrally with frames located on opposite ends of said guide cylinder, said frames being attached to said side plates of said reel with said guide cylinder extending between said frames.

3. A level winder for fishing reels, comprising: a traverse cam shaft supported between side plates of a fishing reel; means for turning said traverse cam shaft, said means for turning including a handle shaft; a guide cylinder fitted around said traverse cam shaft, supported between said side plates and formed so that an outer surface of said guide cylinder has a non-circular cross-sectional shape; a fishing line guide member provided at an upper portion thereof with a fishing line guiding bore, and at a lower side portion thereof with an opening via which said fishing line guide member is fitted around the outer surface of said guide cylinder in the longitudinal direction so that said guide member can be moved slidingly along said guide cylinder between said guide plates; a disengagement preventing cover fitted detachably in said opening; a locking claw engaged with said traverse cam shaft; and a cap which supports said locking claw on said fishing line guide member, and which is fitted detachably around a lower portion of said fishing line guide member.

4. A level winder for fishing reels according to claim 3, wherein said guide cylinder is formed integrally with frames located on opposite ends of said guide cylinder, said frames being attached to said side plates of said reel with said guide cylinder extending between said frames.

5. A level winder for fishing reels, comprising: a traverse cam shaft supported between side plates of a fishing reel; means for turning said traverse cam shaft, said means for turning including a handle shaft; a guide cylinder fitted around said traverse cam shaft, supported between said side plates and formed so that an outer surface of said guide cylinder has a non-circular cross-sectional shape and an upper side; a fishing line guide member provided at an upper portion thereof with a fishing line guiding bore, and at a lower portion thereof with a bifurcated part defining an opening via which said fishing line guide member is fitted around the outer surface of said guide cylinder from the upper side thereof so that said guide member can be moved slidingly along said guide cylinder between said guide plates; a locking claw engaged with said traverse can shaft; and a reinforcing support member which supports said locking claw on said fishing line guide member, and prevents inward deformation of said bifurcated part, and which is fitted firmly and detachably in the opening of said bifurcated part.

6. A level winder for fishing reels according to claim 5, wherein said guide cylinder is formed integrally with frames located on opposite ends of said guide cylinder, said frames being attached to said side plates of said reel with said guide cylinder extending between said frames.

7. A level winder for fishing reels, comprising: a traverse cam shaft supported between side plates of a fishing reel; means for turning said traverse cam shaft, said means for turning including a handle shaft; a guide cylinder fitted around said traverse cam shaft, supported between said side plates and formed so that an outer surface of said guide clyinder has a non-circular cross-sectional shape and an upper side; a fishing line guide member provided at an upper portion thereof with a fishing line guiding bore, and at a lower portion thereof with a bifurcated part defining an opening via which said fishing line guide member is fitted around the outer surface of said guide cylinder from the upper side thereof so that said guide member can be moved slidingly along said guide cylinder between said guide plates; a locking claw engaged with said traverse can shaft; and a reinforcing support member which supports said locking claw on the fishing line guide member, and prevents inward deformation of said bifurcated part, and which is fitted firmly and detachably in the opening of said bifurcated part, and a cap which supports said reinforcing support member so that said support member does not come off, and which is fitted detachably around said bifurcated part.

8. A level winder for fishing reel according to claim 7, wherein said guide cylinder is formed integrally with frames located on opposite ends of said guide cylinder, said frames being attached to said side plates of said reel with said guide cylinder extending between said frames.

* * * * *